United States Patent
Kellogg et al.

(10) Patent No.: US 11,383,576 B2
(45) Date of Patent: Jul. 12, 2022

(54) DISCONNECTING STABILIZER BAR ASSEMBLY HAVING DISCONNECT MECHANISM WITH REDUCED BACKLASH

(71) Applicant: AMERICAN AXLE & MANUFACTURING, INC., Detroit, MI (US)

(72) Inventors: Philip R. Kellogg, Macomb, MI (US); Dale K. Benedict, Commerce Township, MI (US); Jeffrey L. Kincaid, Clarkston, MI (US); Thomas George Kaveney, II, St. Marys, PA (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 17/146,595

(22) Filed: Jan. 12, 2021

(65) Prior Publication Data
US 2021/0129619 A1    May 6, 2021

Related U.S. Application Data

(63) Continuation of application No. PCT/US2019/042591, filed on Jul. 19, 2019.
(Continued)

(51) Int. Cl.
*B60G 21/055* (2006.01)

(52) U.S. Cl.
CPC .... *B60G 21/0555* (2013.01); *B60G 2202/135* (2013.01); *B60G 2202/42* (2013.01);
(Continued)

(58) Field of Classification Search
CPC .............. B60G 21/055; B60G 21/0555; B60G 21/0556; B60G 2202/135; B60G 2202/42;
(Continued)

(56) References Cited

U.S. PATENT DOCUMENTS

| 1,423,631 A | 7/1922 | Skaife |
| 6,428,019 B1 | 8/2002 | Kincaid et al. |
| (Continued) | | |

FOREIGN PATENT DOCUMENTS

| DE | 102004059274 A1 * | 6/2006 | ......... B60G 21/0555 |
| DE | 102012000987 A1 * | 7/2013 | ............. B64C 13/28 |
| JP | 2013040652 | 2/2013 | |

OTHER PUBLICATIONS

International Search Report for International Application PCT/US2019/042591, dated Nov. 6, 2019.
(Continued)

*Primary Examiner* — James A English
*Assistant Examiner* — Daniel M. Keck
(74) *Attorney, Agent, or Firm* — Burris Law, PLLC (57) ABSTRACT

A stabilizer bar assembly having a pair of bar members and a clutch assembly with a first and second couplers, which are fixedly coupled to the bar members, a coupling sleeve and a rotary lock. The coupling sleeve matingly engages the first coupler. The coupling sleeve is movable along an axis between a first position, in which the coupling sleeve is disengaged from the second coupler to permit relative rotation between the stabilizer bar members about the axis, and a second position in which the coupling sleeve is engaged to the first and second couplers. The rotary lock has lock members that are fixedly coupled to the coupling sleeve and the second coupler. The lock members engage one another when the coupling sleeve is in the second position to inhibit relative movement about the rotational axis between the coupling sleeve and the second coupler.

12 Claims, 7 Drawing Sheets

Related U.S. Application Data (60) Provisional application No. 62/701,031, filed on Jul. 20, 2018.

(52) U.S. Cl.
CPC .............. *B60G 2204/8306* (2013.01); *B60G 2600/182* (2013.01); *B60G 2800/012* (2013.01)

(58) Field of Classification Search
CPC .... B60G 2204/8302; B60G 2204/8306; B60G 2600/182; B60G 2800/012; B60G 2206/427
See application file for complete search history.

(56) References Cited

U.S. PATENT DOCUMENTS

| | | | |
|---|---|---|---|
| 6,637,757 B2 | 10/2003 | Ignatius et al. | |
| 7,195,579 B2 | 3/2007 | Claussen et al. | |
| 2002/0121748 A1 | 9/2002 | Ignatius et al. | |
| 2006/0017251 A1* | 1/2006 | Taneda | B60G 21/0555 280/124.106 |
| 2006/0212199 A1* | 9/2006 | Urababa | B60G 21/0555 701/38 |
| 2007/0085295 A1 | 4/2007 | Johnson et al. | |
| 2008/0007023 A1* | 1/2008 | Anderten | B60G 17/015 280/124.106 |
| 2008/0106055 A1 | 5/2008 | Pinkos et al. | |
| 2008/0277891 A1 | 11/2008 | Adams, III et al. | |
| 2009/0058031 A1 | 3/2009 | Johnson et al. | |
| 2013/0291664 A1* | 11/2013 | Freund | B60G 21/0555 74/89 |
| 2018/0086172 A1* | 3/2018 | Breton | B60G 21/0558 |

OTHER PUBLICATIONS

Written Opinion for International Application PCT/US2019/042591, dated Nov. 6, 2019.

* cited by examiner

DISCONNECTING STABILIZER BAR ASSEMBLY HAVING DISCONNECT MECHANISM WITH REDUCED BACKLASH

CROSS-REFERENCE TO RELATED APPLICATIONS

This application is a (bypass) continuation of International Patent Application No. PCT/US2019/042591 filed Jul. 19, 2019, which claims the benefit of U.S. Provisional Application No. 62/701,031 filed Jul. 20, 2018, the disclosure of which is incorporated by reference as if fully set forth in detail herein.

FIELD

The present disclosure relates to a disconnecting stabilizer bar assembly having a disconnect mechanism with reduced backlash.

BACKGROUND

This section provides background information related to the present disclosure which is not necessarily prior art.

Traditional vehicle suspension systems include resilient devices, such as coil springs and leaf springs, to flexibly support a portion of a vehicle and enable all of the wheels to maintain contract with the ground when traversing uneven terrain. Segregating the vehicle into unsprung and sprung portions in this manner is also useful for preventing severe impulsive forces from being transmitted to the vehicle occupants.

It is known that when vehicle travels around a corner, centrifugal forces acting on the vehicle tend to cause the sprung portion of the vehicle to roll. In severe instances, the effects of roll can cause instability and impede the ability of the driver to control the vehicle. Although the effects of roll are more pronounced with vehicles having a comparatively high center of gravity, such as vans or trucks, every vehicle is affected by roll.

In tuning the ride and handling of a vehicle, it is often desirable to soften or lower the spring rate of the suspension's springs to provide a softer, less harsh ride. One of the main drawbacks associated with this approach is that a suspension system having springs with a relatively low spring rate permits the vehicle body to roll at a relatively higher rate. Accordingly, it would seem that the combination of springs with a very low spring rate and a relatively stiff stabilizer bar would optimize both the ride and handling of the vehicle.

The relatively stiff stabilizer bar, however, tends to directly connect the vehicle wheels such that the motion of one wheel is copied to another wheel. If a vehicle so equipped was to strike a bump with one wheel, for example, the upward force (i.e., jounce) imparted to that wheel would be transmitted through the stabilizer bar to the opposite wheel, causing the opposite wheel to move in an upward direction. This "cross-talk" between the vehicle wheels is highly undesirable as it adversely affects vehicle ride.

Another drawback of stabilizer bars is that their torsional stiffness inhibits the free travel of the vehicle wheels. Modern materials and design techniques have substantially reduced the weight of the vehicle wheels and mounting structures to such an extent that the weight of a wheel and its mounting structure is typically insufficient to cause the stabilizer bar to rotate. While this problem is rarely, if ever, noticed on the relatively flat surfaces of modern roads, it can become apparent when the vehicle is operated over un-even terrain. In some situations, it is possible for one of the vehicle wheels to remain in an elevated position over a dip in the terrain due to the torsional resistance of the stabilizer bar. While situations of this severity are not routinely encountered, the fact remains that the stabilizer bar reduces vehicle traction in some situations.

One solution to the above-mentioned drawbacks is disclosed in copending and commonly assigned U.S. patent application Ser. No. 09/663,613 entitled "Semi-Active Anti-Roll System", the disclosure of which is hereby incorporated by reference as if fully set forth herein. This system employs a pair of stabilizer bar members, which are selectively uncoupled via a clutch assembly to improve vehicle traction in some situations. Despite the numerous advantages of this system, it is susceptible to improvement.

For example, a certain amount of backlash in the clutch assembly is required to permit the clutch assembly to engage and disengage. While this backlash is relatively small, it would be desirable in some situations to reduce the backlash without impairing the ability of the clutch assembly to engage and disengage.

SUMMARY

This section provides a general summary of the disclosure, and is not a comprehensive disclosure of its full scope or all of its features.

In one form, the present disclosure provides a stabilizer bar assembly that includes first and second stabilizer bar members and a clutch assembly. Each of the first and second stabilizer bar members is generally L-shaped and has a central segment, which is rotatable about a rotational axis, and an arm segment that extends generally perpendicular to the central segment. The clutch assembly permits selective non-rotational coupling of the central segments of the first and second stabilizer bar members to one another. The clutch assembly includes a first coupler, a second coupler, a coupling sleeve and a rotary lock. The first coupler is non-rotatably coupled to the central segment of the first stabilizer bar member. The second coupler is non-rotatably coupled to the central segment of the second stabilizer bar member. The coupling sleeve is axially slidably but non-rotatably engaged to the first coupler. The coupling sleeve is movable along the rotational axis between a first position, in which the coupling sleeve is disengaged from the second coupler to permit relative rotation between the central segments of the first and second stabilizer bar members about the rotational axis, and a second position in which the coupling sleeve is engaged to the first and second couplers. The rotary lock has a first lock member and a second lock member. The first lock member is fixedly coupled to the coupling sleeve. The second lock member is fixedly coupled to the second coupler. Placement of the coupling sleeve in the second position engages the first lock member to the second lock member to inhibit relative movement about the rotational axis between the coupling sleeve and the second coupler.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
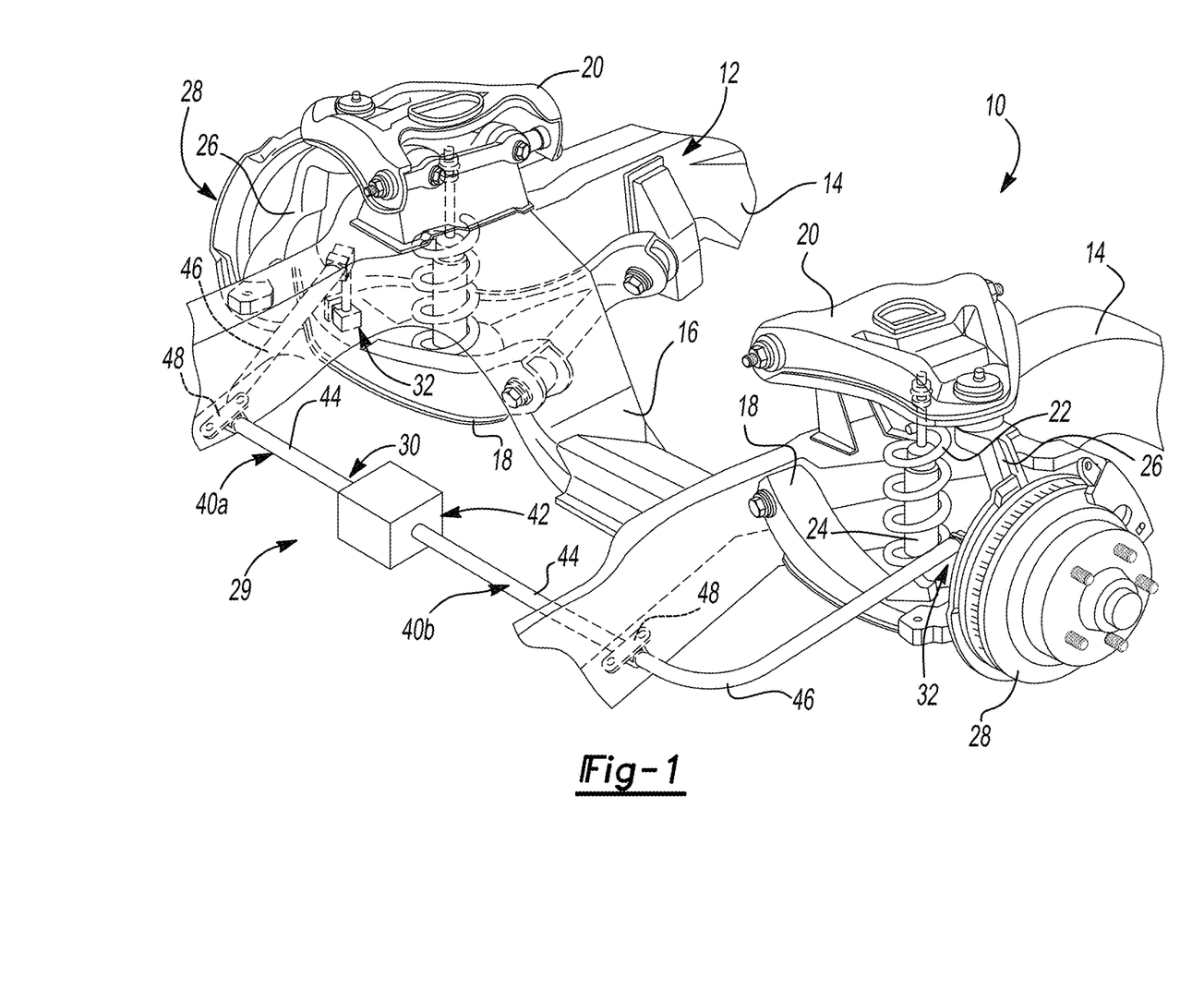
FIG. 1 is a perspective view of an exemplary independent front wheel suspension having a stabilizer bar assembly constructed in accordance with the teachings of the present disclosure.

With reference to FIG. 1 of the drawings, an exemplary independent front wheel suspension is generally indicated by reference numeral 10. The independent front wheel suspension system 10 is of a type that has suspension components at each wheel, and these components are suspended from a vehicle frame or body. Reference will be made to a vehicle frame in the present disclosure, yet those skilled in the art will recognize that many current vehicles do not have a frame as such, but instead have regions of the body, which act as an integrated frame structure. With this in mind, the frame 12 is shown to partially include a pair of longitudinal side rails 14 and a crossbeam 16.

At each wheel, the suspension system 10 includes a lower control arm 18 and an upper control arm 20, each of which being pivotally attached to the frame 12. A strut assembly having a helical coil spring 22 and a strut damper 24 is retained between an intermediate portion of the lower control arm 18 and the frame 12 to support the weight of the vehicle body and any loads which are transmitted through a respective one of the lower control arms 18. Each upper control arm 20 is connected to a corresponding one of the lower control arms 18 by a steering knuckle 26. A hub and rotor assembly 28 is rotatably attached to a spindle portion (not shown) of the steering knuckle 26 such that a wheel and tire (also not shown) may be mounted thereon. The suspension system 10 further includes an anti-roll system 29 that can have a stabilizer bar assembly 30 and a pair of end links 32 that connect the ends of the stabilizer bar assembly 30 to the lower control arms 18.

The stabilizer bar assembly 30 can include a pair of stabilizer bar members 40a, 40b and a disconnect mechanism or clutch assembly 42. Each of the stabilizer bar members 40a, 40b can be generally L-shaped having a central segment 44, which can extend laterally across the vehicle, and an arm segment 46 that can extend longitudinally along the vehicle. Each of the central segments 44 is rotatably attached to the frame rails 14 by a mounting bracket 48. Each arm segment 46 can have a first end, which can be non-rotatably (e.g., fixedly) coupled to an outboard end of an associated one of the central segments 44, and a second, opposite end that can be connected to a corresponding one of the lower control arms 18 by one of the end links 32.

Figure 2:
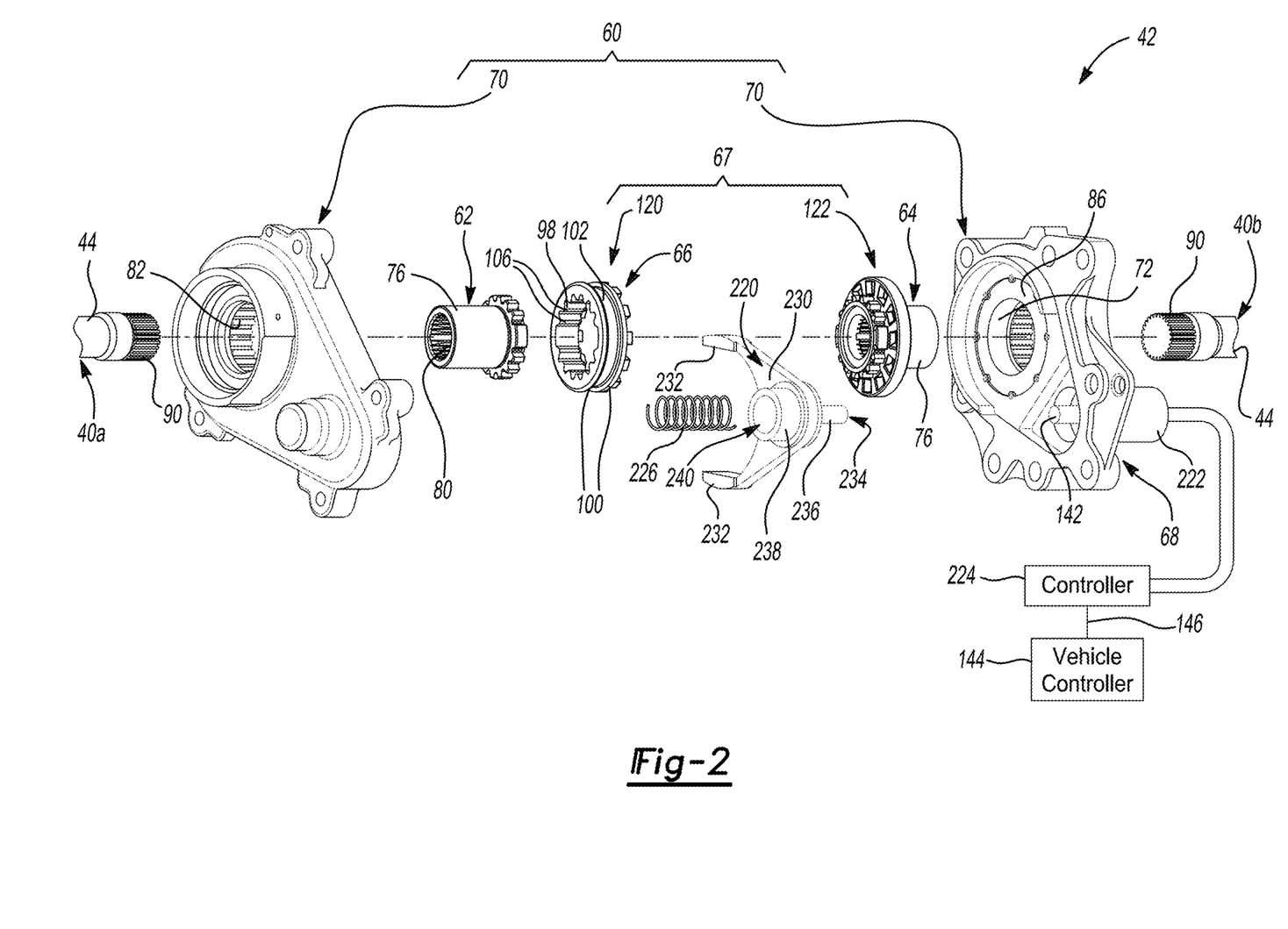
FIG. 2 is an exploded perspective view of the stabilizer bar assembly.
Figure 3:
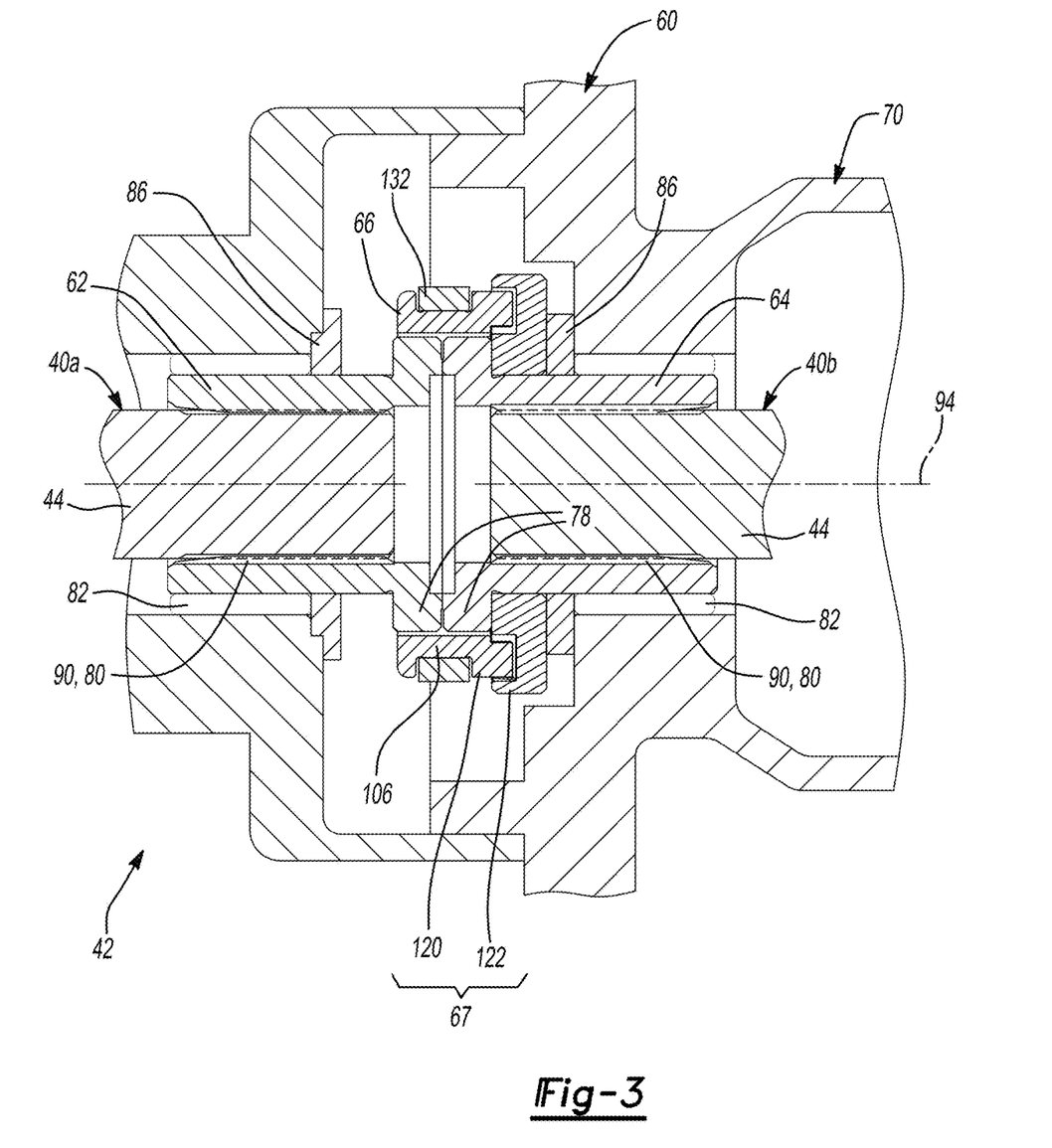
FIG. 3 is a longitudinal cross-section of a portion of the stabilizer bar assembly.

In FIGS. 2 and 3, the clutch assembly 42 can include a housing assembly 60, first and second couplers 62 and 64, respectively, a coupling sleeve 66, a rotary lock 67 and an actuator assembly 68. The housing assembly 60 can include a pair of housing members 70 that can cooperate to define a central cavity 72 into which the central segments 44 of the stabilizer bar members 40a, 40b can be received.

Each of the first and second couplers 62 and 64 can include a journal portion 76, an external gear portion 78 and an internal spline portion 80. The journal portion 76 can be supported for rotation relative to the housing assembly 60 by an associated bearing 82 that can be received in the central cavity 72. The internal spline portion 80 can be sized to matingly receive an external spline portion 90 formed onto a proximal end of a corresponding one of the stabilizer bar members 40a, 40b. Mating engagement of the external spline portion 90 of stabilizer bar member 40a and the internal spline portion 80 of first coupler 62 couples the stabilizer bar member 40a and first coupler 62 for rotation about a rotational axis 94 of the stabilizer bar members 40a, 40b. Likewise, mating engagement of the external spline portion 90 of the stabilizer bar member 40b and the internal spline portion 80 of second coupler 64 couples the stabilizer bar member 40b and second coupler 64 for rotation about the rotational axis 94.

The coupling sleeve 66 can include an internal spline portion 98 and a pair of annular flanges 100. The internal spline portion 98 can include an aperture 104 that can define a plurality of gear teeth 106. The aperture 104 can be configured in a manner that is complementary to the external gear portion 78 of the first and second couplers 62 and 64 such that the gear teeth 106 of coupling sleeve 66 can matingly engage the gear teeth 110 of first and second couplers 62 and 64. Configuration in this manner permits coupling sleeve 66 to slide along the rotational axis 94 while remaining in mating engagement with first coupler 62. The coupling sleeve 66 can be translated along first coupler 62 between a first position, in which the coupling sleeve 66 is matingly engaged only to the first coupler 62, and a second position in which the coupling sleeve 66 is matingly engaged to both the first and second couplers 62 and 64. The gear teeth 106 of the coupling sleeve 66 and the teeth of the external gear portion 78 of the second coupler 64 can be chamfered to improve the ability with which they matingly engage with one another. The annular flanges 100 can extend about the outer circumference of the coupling sleeve 66 and are spaced apart from one another along the rotational axis 94. The annular flanges 100 can cooperate to define a clutch fork groove 102.

Figure 4:
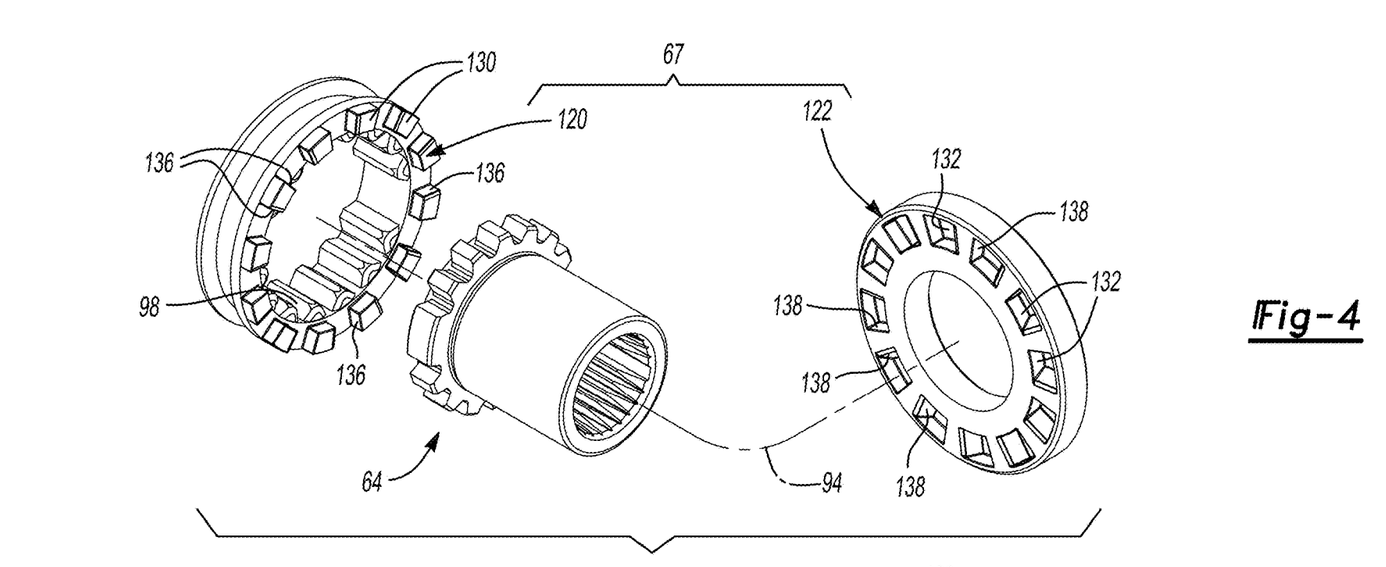
FIG. 4 is an exploded perspective view of a portion of the stabilizer bar assembly, the view showing a portion of a clutch assembly that includes a rotary lock.

With reference to FIGS. 2 and 4, the rotary lock 67 can include a first lock member 120, which can be non-rotatably (e.g., fixedly) coupled to the coupling sleeve 66, and a second lock member 122 that can be non-rotatably (e.g., fixedly) coupled to the second coupler 64. The first lock member 120 is configured to engage to the second lock member 122 when the coupling sleeve 66 is in the second position so that the first and second lock members 120 and 122 cooperate to inhibit relative rotation between coupling sleeve 66 and the second coupler 64. A thrust washer 86 can be disposed between the second lock member 122 and an associated one of the housing members 70. In the example provided, the first lock member 120 comprises a plurality of face teeth 130, which are disposed about the circumference of an axial end of the coupling sleeve 66 and extend parallel to the rotational axis 94, and the second lock member 122 comprises a plurality of recesses 132 that are disposed circumferentially about the rotational axis 94. The first and second lock members 120 and 122 can be formed of an appropriate material, such as a high strength steel in a desired process. For example, the face teeth 130 can be milled, whereas the recesses can be formed in a fine blanking operation. The first and second lock members 120 and 122 can be heat-treated in a desired manner to provide desired strength and wear resistance. Moreover, the face teeth 130 and/or the recesses 132 can be formed and/or undergo a secondary process (e.g., burnishing, coining, lapping) and/or be treated (e.g., with a coating such as phosphate) to provide desired frictional characteristics between the face teeth 130 and the recesses 132.

Figure 5:
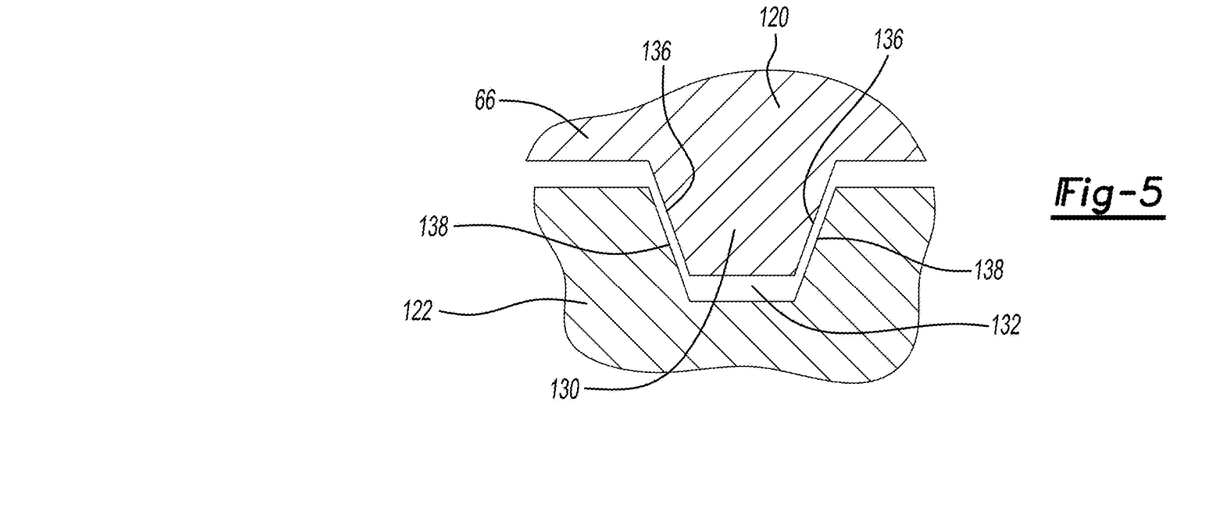
FIG. 5 is a sectional view of a portion of the stabilizer bar assembly, the view showing the rotary lock members of the rotary lock in engagement with one another.

With reference to FIGS. 4 and 5, the face teeth 130 have a tapered configuration with side surfaces 136 that converge toward one another with increasing distance from the axial end of the coupling sleeve 66 in a direction toward the second lock member 122. The recesses 132 in the second lock member 122 have correspondingly tapered side surfaces 138 and are sufficiently deep to permit the both side surfaces 136 of each of the face teeth 130 to frictionally engage with the tapered side surfaces 138 of each of the recesses 132 when the coupling sleeve 66 is in the second position. It will be appreciated from this disclosure that the wedging between the side surfaces 136 and the tapered side surfaces 138 when the face teeth 130 are seated into the recesses 132 will eliminate backlash that would otherwise be present between the coupling sleeve 66 and the second coupler 64.

With additional reference to FIG. 2, the engagement of the first and second lock members 120 and 122 can reduce the backlash that would otherwise occur between the coupling sleeve 66 and the first and second couplers 62 and 64 by one-half in situations where the fit between the coupling sleeve 66 and the external gear portions 78 of the first and second couplers 62 and 64 is the same. Moreover, the external gear portion 78 of the second coupler 64 and/or a portion of the internal gear portion 98 of the coupling sleeve 66 can be configured to provide a greater magnitude of backlash between the second coupler 64 and the coupling sleeve 66 to render it somewhat easier to engage the internal gear portion 78 of the coupling sleeve 66 to the external gear portion 78 of the second coupler 64. This greater magnitude of backlash would have no effect on the backlash of the clutch assembly 42 (FIG. 2) when the coupling sleeve 66 was positioned in the second position due to the engagement of the rotary lock 67 and the ability of the rotary lock 67 to eliminate backlash between the coupling sleeve 66 and the second coupler 64.

With renewed reference to FIGS. 2 and 3, movement of the coupling sleeve 66 along the rotational axis 94 between the first and second positions can be controlled by the actuator assembly 68. In the example illustrated, the actuator assembly 68 includes a clutch fork 220, a linear motor 222, a controller 224 and a spring 226. The clutch fork 220 can include a generally U-shaped body portion 230, a pin member 234 and a spring guide 238. The U-shaped body portion 230 can have a pair of arms 232 that can be disposed in the clutch fork groove 102 to thereby couple the clutch fork 220 to the coupling sleeve 66 in a manner that inhibits or limits relative axial movement there between while permitting relative rotational movement there between. The pin member 234 can be fixedly coupled to and extend from a first side of the body portion 230. A first portion 236 of the pin member 234 can be received in the cavity 72. The spring guide 238 can be fixedly coupled to and extend from a second side of the body portion 230. The spring guide 238 is sized to receive spring 226.

The linear motor 222 can include an output member 142 that can contact the first portion 236 of pin member 234. In the particular example provided, the linear motor 222 is a solenoid, but it will be appreciated that any type of linear motor, including a fluid-powered cylinder or a lead screw, could be employed. The linear motor 222 can be operated to selectively move the first portion 236 of the pin member 234 between a first actuator position and a second actuator position.

The controller 224 can be operable for operating the linear motor 222 in response to receipt of an actuator signal that is transmitted to the controller 224 from a vehicle controller 144. In its most basic form, the actuator signal can be a discreet signal that toggles between two predetermined values (e.g., 0 and 1) that are indicative of the placement of the coupling sleeve 66 in a desired one of the first and second positions. Upon receipt of the actuator signal, the controller 224 can operate the linear motor 222 as necessary to affect the position of the coupling sleeve 66 (via the position of the clutch fork 220).

Placement of the coupling sleeve 66 in the first position effectively de-couples stabilizer bar members 40a and 40b such that they are permitted to rotate independently of one another about rotational axis 94. Placement of coupling sleeve 66 in the second position effectively couples the external spline portions 90 of the stabilizer bar members 40a and 40b to one another for common rotation about the rotational axis 94. Those of ordinary skill in the art will understand that the rotational coupling of stabilizer bar members 40a and 40b in this manner will permit the transmission of torque there between, which resists the roll of a vehicle body (not shown).

Figure 6:
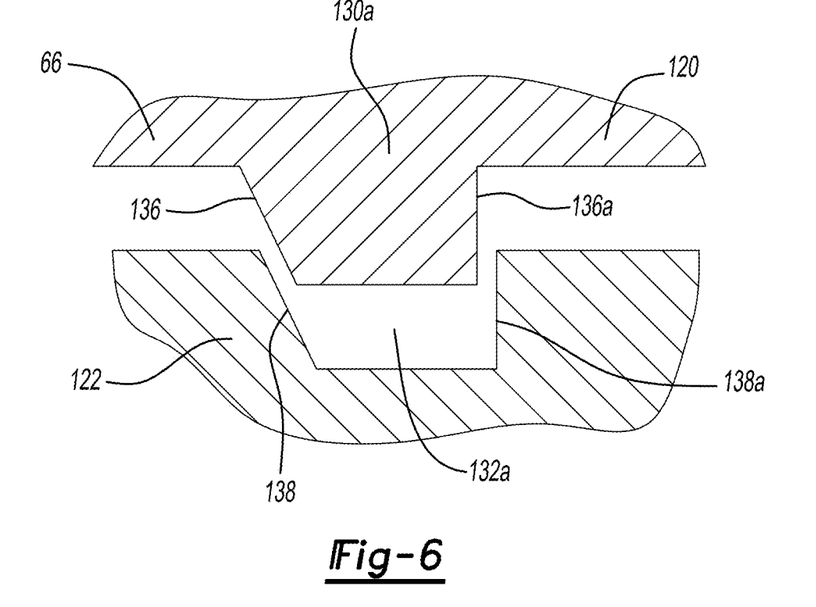
FIGS. 6 and 7 are views similar to that of FIG. 5 but depicting rotary lock members having differently configured teeth.

While the face teeth 130 and the recesses 132 have been illustrated and described being formed on the first lock member 120 and the second lock member 122, respectively, and each having opposite sides that are defined by planes that are slanted to the rotary axis and which are mirror images of one another, the rotary lock could be configured somewhat differently. For example, the recesses 132 could be formed into the first lock member 120 and the face teeth 132 could be formed on the second lock member 122. Moreover, the face teeth 130 and the recesses 132 could be formed somewhat differently. With reference to FIG. 6, for example, one of the surfaces 136a of the face teeth 130a and one of the surfaces 138a of the correspondingly tapered side surfaces 138 could be formed so as to lie within planes that are parallel one another (i.e., do not themselves cause wedging engagement with one another as the face teeth 130a are more deeply inserted into the recesses 132a). The surfaces 136 of the face teeth 130a that are opposite the surfaces 136a and the correspondingly tapered side surfaces 138 of the recesses 132a that are opposite the correspondingly tapered side surfaces 138a can, however, cause wedging engagement with one another as the face teeth 130a are more deeply inserted into the recesses 132a.

Figure 7:
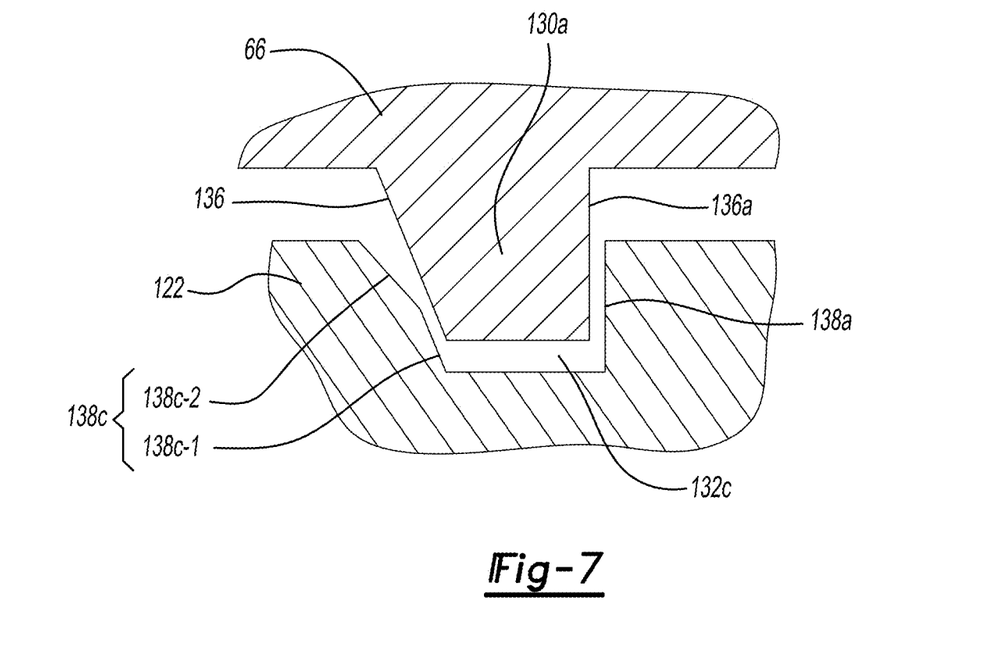

With reference to FIG. 7, each of the recesses 132b is illustrated as having opposite a side surface 138c having two planar portions 138c-1 and 138c-2. The planar portions 138c-1 are located at the deepest parts of the recesses 132c and the planar portions 138c-2 are located at the shallowest parts of the recesses 132c. Each first planar portion 138c-1 is defined by a first angle 150, which extends between the first planar portion 138-1 and a central axis 152 of an associated recess 132c, while each second planar portion 138c-2 is defined by a second, larger angle 154 that extends between the second planar portion 138c-2 and the central axis 152 of the associated recess 132c. In operation, the surfaces 136 and 136a of the face teeth 130a are configured to engage the first planar portion 138c-1 of the surface 138c and the surface 138b of the recesses 132c, respectively.

Figure 8:
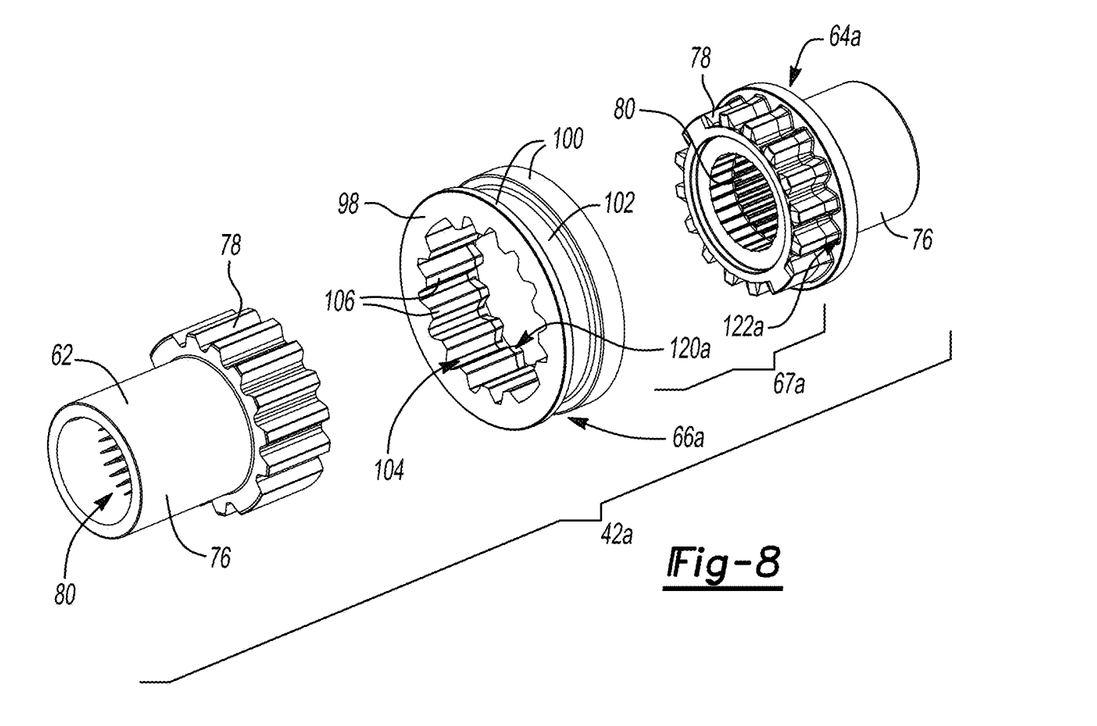
FIG. 8 is an exploded perspective view of a portion of a portion of another clutch assembly constructed in accordance with the teachings of the present disclosure.
Figure 9:
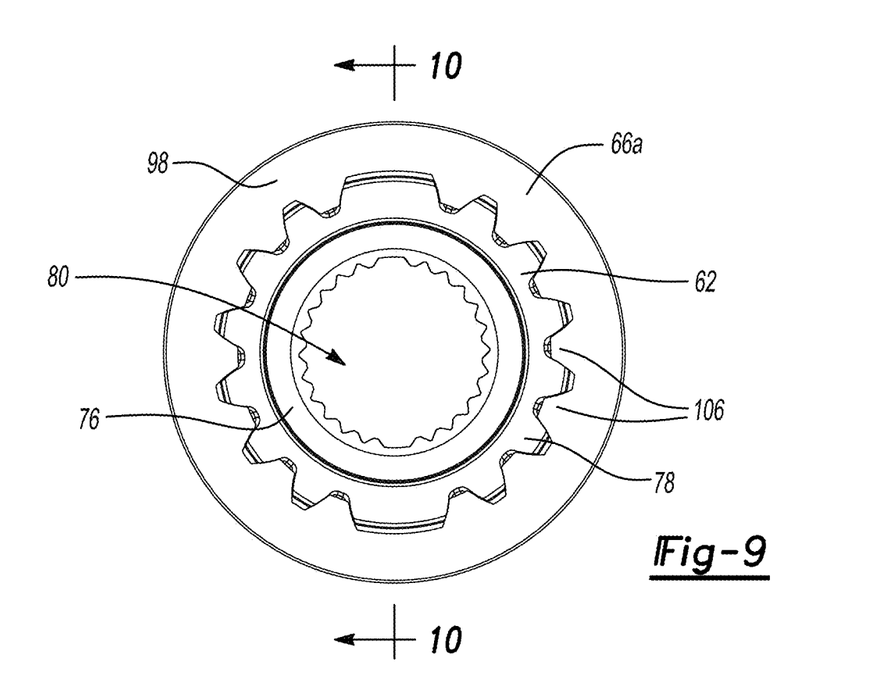
FIG. 9 is a side elevation view of the portion of the clutch assembly that is depicted in FIG. 8.
Figure 10:
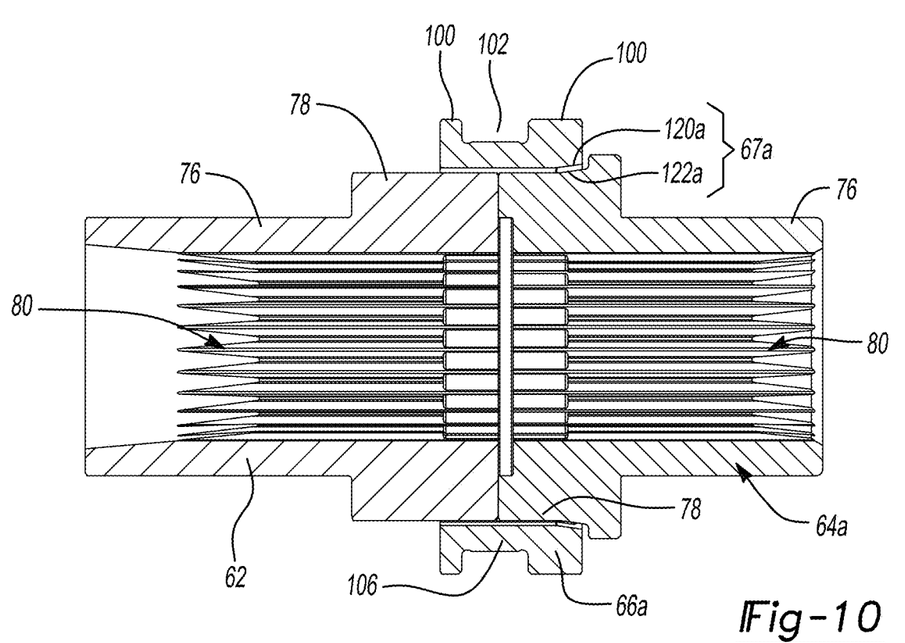
FIG. 10 is a section view taken along the line 10-10 of FIG. 9.

While the clutch assembly 42 has been illustrated and described as having a rotary lock 67 with a first lock member 120, which consists of face teeth 130 that extend from an axial end of the sleeve 66, and a second lock member 122 that is mounted about the journal portion 76 of the second coupler 64 and which includes recesses 132 that receive the face teeth 130, it will be appreciated that the rotary lock 67 could be formed somewhat differently. With reference to FIGS. 8 through 10, a portion of a clutch assembly 42a having an alternately configured rotary lock 67a is illustrated. In this example, the first lock member 120a is unitarily and integrally formed with the gear teeth 106 in the aperture 104 of the internal spline portion 98 of the sleeve 66a, while the second lock member 122a is unitarily and integrally formed with the teeth of the external gear portion 78 of the second coupler 64a. Otherwise, the second coupler 64a and the sleeve 66a are identical to the second coupler 64 and the sleeve 66 described above and illustrated in FIG. 2.

The female tooth form of the teeth of first lock member 120a and the male tooth form of the teeth of the second lock member 122a are tapered so as to rotationally lock the first and second lock members 120a and 122a together when the first lock member 120a has sufficiently translated onto the second lock member 122a. Since the first lock member 120a is unitarily and integrally formed with the sleeve 66a, and since the second lock member 122a is unitarily and integrally formed with the second coupler 64a, the locking of the first and second lock members 120a and 122b to one another effectively eliminates backlash between the sleeve 66a and the second coupler 64a so that the backlash of the clutch assembly 42a is merely the clearance between the gear teeth of the external gear portion 78 of the first coupler 62 and the gear teeth 106 of the internal spline portion 98 of the sleeve 66a.

Figure 11:
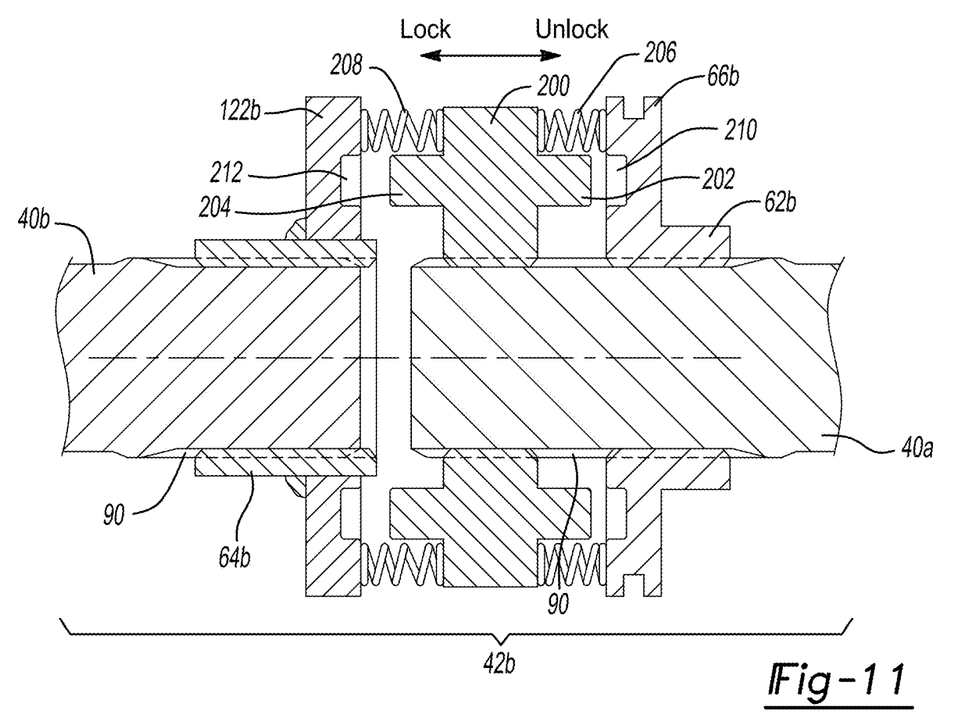
FIG. 11 is an elevation view in partial section of a portion of yet another clutch assembly constructed in accordance with the teachings of the present disclosure.

In the example of FIG. 11, the first coupler 62b of the clutch assembly 42b is non-rotatably but slidably engaged to the external spline portion 90 of the stabilizer bar 40a, the sleeve 66b is fixedly coupled (e.g., integrally and unitarily formed with) the first coupler 62b, and the rotary lock 67b of the clutch assembly 42b includes a first lock member 120b, a second lock member 122b, a slide collar 200, a third lock member 202, a fourth lock member 204, a first biasing spring 206 and a second biasing spring 208. The first and second couplers 62b and 64b can be generally similar to the first and second couplers 62 and 64 (FIG. 4), respectively, except that the external gear portion 78 (FIG. 4) is omitted from each of the first and second couplers 62b and 64b in the particular example illustrated.

The first and second lock members 120b and 122b can be generally similar to the second lock member 122 (FIG. 4). The first lock member 120b can be fixedly coupled to the sleeve 66b and can define a plurality of recesses 210 that are similar to the recesses 132 (FIG. 4) in the second lock member 122 (FIG. 4). Similarly, the second lock member 122b can be fixedly coupled to the second coupler 64b and can define a plurality of recesses 212 that are similar to the recesses 132 (FIG. 4) in the second lock member 122 (FIG. 4). The slide collar 200 can define an internally splined aperture 214 that can be slidably engaged to the external spline portion 90 of the stabilizer bar 40a. The slide collar 200 is located axially between the first and second couplers 62b and 64b.

The first lock member 120b can be generally similar to the first lock member 120 (FIG. 4) and can be fixedly coupled to (e.g., unitarily and integrally formed with) the sleeve 66b. The second lock member 122b can be generally similar to the second lock member 122 (FIG. 4) and is fixedly coupled to second coupler 64b. The second coupler 64b is fixedly coupled to the stabilizer bar 40b, for example by an interference fit with the external splined portion 90 on the stabilizer bar 40b. Alternatively, the second coupler 64b could be unitarily and integrally formed with the stabilizer bar 40b (in which case the external splined portion 90 would not be needed). The third lock member 202 can comprise face teeth that are similar to the face teeth 130 (FIG. 4) and which extend from an axial end of the sliding collar 200 that is opposite the first lock member 120b. The fourth lock member 204 can comprise face teeth that are similar to the face teeth 130 (FIG. 4) and which extend from an axial end of the sliding collar 200 that is opposite the second lock member 122b. The first biasing spring 206 is disposed between the first lock member 120b and the sliding collar 200, while the second biasing spring 208 is disposed between the sliding collar 200 and the second lock member 122b. The spring rate of the first biasing spring 206 is greater than the spring rate of the second biasing spring 208.

The sleeve 66b can be moved along the external spline portion 90 of the stabilizer bar 40a to drive the first lock member 120b, the sliding collar 200 and the third and fourth lock members 202 and 204 axially toward the second lock member 122b. Movement of the sleeve 66b initially causes corresponding motion of the first lock member 120b, which causes the second biasing spring 208 to compress as the fourth lock member 204 is driven into engagement with the second lock member 122b. At the point where the fourth lock member 204 is fully engaged to the second lock member 122b, the second and fourth lock members 122b and 204 cooperate with the second coupler 64b and the sliding collar 200 to rotationally couple the first stabilizer bar 40a to the second stabilizer bar 40b. Further axial movement of the sleeve 66b toward the second lock member 122b will eventually cause the first biasing spring 206 to compress to the point where the first lock member 120b engages the third lock member 202. Full engagement between the first and third lock members 120b and 202 and between the second and fourth lock members 122b and 204 eliminates all lash in the connection between the stabilizer bars 40a and 40b.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A stabilizer bar assembly comprising:
first and second stabilizer bar members, each of the first and second stabilizer bar members being generally L-shaped and having a central segment, which is rotatable about a rotational axis, and an arm segment that extends generally perpendicular to the central segment; and a clutch assembly for selectively non-rotatably coupling the central segments of the first and second stabilizer bar members to one another, the clutch assembly comprising a first coupler, a second coupler, a coupling sleeve and a rotary lock, the first coupler being non-rotatably coupled to the central segment of the first stabilizer bar member, the second coupler being non-rotatably coupled to the central segment of the second stabilizer bar member, the coupling sleeve being axially slidably but non-rotatably engaged to the first coupler, the coupling sleeve being movable along the rotational axis between a first position, in which the coupling sleeve is disengaged from the second coupler to permit relative rotation between the central segments of the first and second stabilizer bar members about the rotational axis, and a second position in which the coupling sleeve is engaged to the first and second couplers, the rotary lock having a first lock member and a second lock member, the first lock member being fixedly coupled to the coupling sleeve, the second lock member being fixedly coupled to the second coupler, wherein placement of the coupling sleeve in the second position engages the first lock member to the second lock member to inhibit relative movement about the rotational axis between the coupling sleeve and the second coupler;

wherein the first lock member comprises a plurality of face teeth that engage mating features formed on the second lock member; and wherein each of the face teeth comprises a pair of side surfaces, at least one of the side surfaces being tapered so that engagement of the side surfaces of the face teeth to corresponding side surfaces of the mating features reduces backlash that would otherwise occur from torque transmission through the coupling sleeve between the first and second couplers.

2. The stabilizer bar assembly of claim 1, wherein the corresponding one of the mating features comprises a correspondingly tapered side surface.

3. The stabilizer bar assembly of claim 1, wherein the at least one tapered side surface comprises a first portion, which is defined by a first angle between the first portion of the side surface and a central axis of a corresponding one of the face teeth, and a second portion that is defined by a second angle between the second portion of the side surface and the central axis, the second angle being larger than the first angle, and wherein when the coupling sleeve is in the first position, the second portions are disposed along the rotational axis between the face teeth and the first portions.

4. The stabilizer bar assembly of claim 1, further comprising a linear motor that is configured to translate the coupling sleeve between the first and second positions.

5. The stabilizer bar assembly of claim 4, further comprising a spring that biases the coupling sleeve toward the second position.

6. The stabilizer bar assembly of claim 4, wherein the linear motor comprises a solenoid.

7. The stabilizer bar assembly of claim 4, further comprising a fork that is mounted to the coupling sleeve in a manner that permits relative rotation there between but which limits or inhibits relative axial movement there between.

8. A stabilizer bar assembly comprising:

first and second stabilizer bar members, each of the first and second stabilizer bar members being generally L-shaped and having a central segment, which is rotatable about a rotational axis, and an arm segment that extends generally perpendicular to the central segment; and a clutch assembly for selectively non-rotatably coupling the central segments of the first and second stabilizer bar members to one another, the clutch assembly comprising a first coupler, a second coupler, a coupling sleeve and a rotary lock, the first coupler being non-rotatably coupled to the central segment of the first stabilizer bar member, the second coupler being non-rotatably coupled to the central segment of the second stabilizer bar member, the coupling sleeve being axially slidably but non-rotatably engaged to the first coupler, the coupling sleeve being movable along the rotational axis between a first position, in which the coupling sleeve is disengaged from the second coupler to permit relative rotation between the central segments of the first and second stabilizer bar members about the rotational axis, and a second position in which the coupling sleeve is engaged to the first and second couplers, the rotary lock having a first lock member and a second lock member, the first lock member being fixedly coupled to the coupling sleeve, the second lock member being fixedly coupled to the second coupler, wherein placement of the coupling sleeve in the second position engages the first lock member to the second lock member to inhibit relative movement about the rotational axis between the coupling sleeve and the second coupler;

wherein the first coupler has a first gear portion, the second coupler has a second gear portion, and the coupling sleeve has an internally toothed aperture that is engaged to both of the first and second gear portions when the coupling sleeve is in the second position;

wherein the first lock member comprises a plurality of first teeth that are concentric with the internally toothed aperture;

wherein the first teeth are unitarily and integrally formed with the coupling sleeve; and wherein the second lock member comprises a plurality of second teeth that mesh with the first teeth on the coupling sleeve to reduce backlash that would otherwise occur from torque transmission through the coupling sleeve between the first and second couplers.

9. The stabilizer bar assembly of claim 8, wherein the first teeth are internal teeth and the second teeth are external teeth.

10. The stabilizer bar assembly of claim 9, wherein each of the second teeth tapers outwardly from an associated one of the second teeth.

11. A stabilizer bar assembly comprising:

first and second stabilizer bar members, each of the first and second stabilizer bar members being generally L-shaped and having a central segment, which is rotatable about a rotational axis, and an arm segment that extends generally perpendicular to the central segment; and a clutch assembly for selectively non-rotatably coupling the central segments of the first and second stabilizer bar members to one another, the clutch assembly comprising a first coupler, a second coupler, a coupling sleeve and a rotary lock, the first coupler being non-rotatably coupled to the central segment of the first stabilizer bar member, the second coupler being non-rotatably coupled to the central segment of the second stabilizer bar member, the coupling sleeve being axially slidably but non-rotatably engaged to the first coupler, the coupling sleeve being movable along the rotational axis between a first position, in which the coupling sleeve is disengaged from the second coupler to permit relative rotation between the central segments of the first and second stabilizer bar members about the rotational axis, and a second position in which the coupling sleeve is engaged to the first and second couplers, the rotary lock having a first lock member and a second lock member, the first lock member being fixedly coupled to the coupling sleeve, the second lock member being fixedly coupled to the second coupler, wherein placement of the coupling sleeve in the second position engages the first lock member to the second lock member to inhibit relative movement about the rotational axis between the coupling sleeve and the second coupler;

wherein the coupling sleeve is fixedly coupled to the first coupler, wherein the rotary lock further comprises a sliding collar, which is non-rotatably but axially slidably coupled to the central segment of the first stabilizer bar member, a third lock member, and a fourth lock member, the sliding collar being disposed between the first and second couplers, the third lock member being fixedly coupled to and disposed on a first axial side of the sliding collar, the fourth lock member being fixedly coupled to and disposed on a second, opposite axial side of the sliding collar, and wherein placement of the coupling sleeve in the second position directly engages the first and third lock members to one another and directly engages the second and fourth lock members to one another.

12. The stabilizer bar assembly of claim 11, wherein the rotary lock further comprises a first biasing spring and a second biasing spring, the first biasing spring being disposed axially between the first and third lock members, the second biasing spring being disposed axially between the second and fourth lock members and having a spring rate that is less than a spring rate of the first biasing spring.

* * * * *